Patented Jan. 19, 1954

2,666,762

UNITED STATES PATENT OFFICE 2,666,762

DERIVATIVES OF 3-AMINO-2,3-DIHYDROXY-THIONAPHTHENE - 1,1 - DIOXIDE AND PROCESSES FOR PREPARING THE SAME

John W. Cusic, Skokie, Ill., assignor to G. D. Searle & Co., Chicago, Ill., a corporation of Illinois No Drawing. Application April 27, 1951, Serial No. 223,459

8 Claims. (Cl. 260—247.1)

The present invention relates to a new class of derivatives of sulfur-containing heterocycles and, more particularly, to derivatives of 3-amino-2,3-dihydrothionaphthene-1,1-dioxide. The 2,3-dihydrothionaphthene-1,1-dioxide derivatives of this invention can be represented by the structural formula

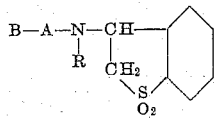

wherein R is a member of the class consisting of hydrogen, lower alkyl radicals, lower aralkyl radicals, lower aryl radicals, and acyl radicals, containing 2 to 15 carbon atoms, A is a saturated, bivalent, lower aliphatic hydrocarbon radical and B is a member of the class consisting of dialkylamino radicals and nitrogen-containing saturated heteromonocycles attached to the hydrocarbon radical A through a nitrogen in the heteromonocycle, and salts thereof.

In the foregoing structural formula, the radical R can represent hydrogen and lower alkyl radicals such as methyl, ethyl, propyl, butyl, amyl, and hexyl, wherein the propyl, butyl, amyl, and hexyl may be either of the straight-chain or branched-chain type, also cyclopentyl, cyclohexyl and alkyl substitutions thereof as methylcyclohexyl, ethylcyclohexyl, and the like. R can also be an aromatic radical such as phenyl, tolyl, anisyl, naphthyl, fluorenyl, phenanthryl, and the like. Within the scope of this invention and of particular interest thereto are compounds wherein the R radical represents acyl groups of the type represented by acetyl, propionyl, butyryl, and other alkanoyl radicals and especially isocarbocyclanecarbonyl radicals, such as cyclopentanecarbonyl, cyclohexanecarbonyl, benzoyl, naphthoyl, fluorenoyl, and the like.

The radical A represents a bivalent, saturated, aliphatic hydrocarbon radical, derived from a straight-chain or branched-chain hydrocarbon, which includes radicals such as ethylene, propylene, butylene, amylene, hexylene and polymethylene radicals such as trimethylene, tetramethylene, pentamethylene and hexamethylene.

The radical B can be a dialkylamino radical wherein the alkyl radical is methyl, ethyl, propyl, butyl, amyl, and hexyl, and wherein the propyl, butyl, amyl and hexyl radicals may be either of the straight-chain or branched-chain type. The radical B can also represent a nitrogen-containing saturated heteromonocycle attached to the radical A through a nitrogen in the heteromonocycle. Radicals falling within this class are piperidine, lupetidine, pyrrolidine, morpholine, thiamorpholine, quinoline, isoquinoline, piperazine, N'-alkylpiperazine and the like. The organic bases of the foregoing type form salts with a variety of inorganic and strong organic acids including sulfuric, phosphoric, hydrochloric, hydrobromic, sulfamic, citric, oxalic, ascorbic, and related acids.

These compounds also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

One of the preferred methods for the preparation of the amines of this invention consists in the condensation of thionaphthene-1,1-dioxide with an excess of a diamine of the type

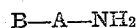

in the presence of an organic solvent such as a lower alcohol, all symbols being defined as hereinabove. For the production of an amide of the type

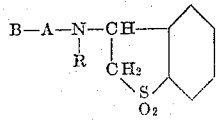

wherein R is an acyl radical, the amine produced as before is acylated in the usual manner using an acyl halide.

Compounds of the type

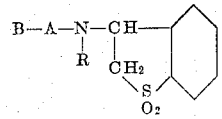

wherein R is an alkyl or aralkyl radical, are prepared from the amines of type

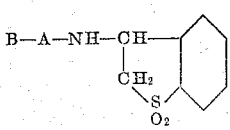

by alkylation and aralkylation in the usual manner using alkyl halides, respectively and aralkyl halides. In this fashion compounds of the following type are obtained:

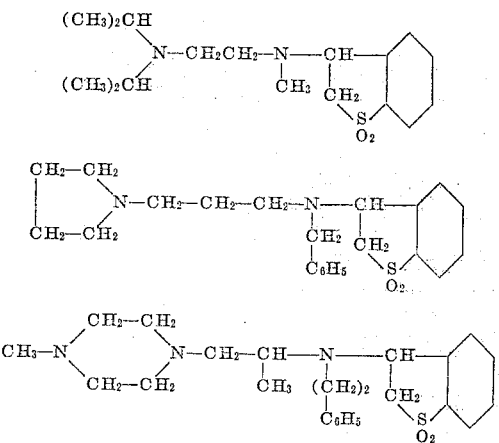

For the preparation of compounds of the type

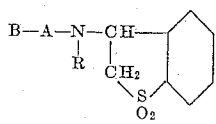

wherein R is an aryl radical, I prefer to react thionaphthene-1,1-dioxide with an amine of the type

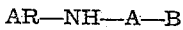

AR—NH—A—B in the presence of an alkaline condensing agent.

In a typical example, thionaphthene-1,1-dioxide is treated with an excess of N-(β-anilinopropyl)piperidine in the presence of sodamide in butanone at refluxing temperature for fifteen hours to produce

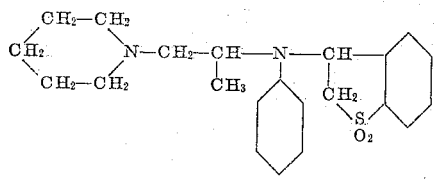

Certain of the 2,3-dihydrothionaphthene-1,1-dioxide derivatives of this invention are valuable intermediates in organic synthesis. They have been found to possess a number of useful pharmacodynamic properties especially upon the cardiovascular, renal and autonomic nervous system. They are also promising as active ingredients in parasiticidal compositions of matter.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples temperatures are given uncorrected in degrees centigrade (° C.) and amounts of material in parts by weight.

*Example 1*

A mixture of 300 parts of thionaphthene-1,1-dioxide, 400 parts of N,N-diethylethylenediamine and 2500 parts of ethanol is stirred and after standing for one hour, heated at refluxing temperature for two hours. The mixture is then concentrated on the steam bath after which ice and dilute hydrochloric acid are added. A portion of the material does not dissolve and is removed on a filter. The filtrate is rendered alkaline by addition of sodium hydroxide and extracted with ether. The ether extract is washed with water and then dried over anhydrous potassium carbonate, filtered and evaporated in vacuo. The 3-(β-diethylaminoethyl) amino-2,3-dihydrothionaphthene-1,1-dioxide forms an oil. A series of crystalline derivatives can be prepared. Thus, 200 parts of the amine can be heated at refluxing temperature with 140 parts of cyclohexanecarbonyl chloride in 2400 parts of benzene for 12 hours. After cooling, the oily precipitate is separated, taken up in isopropanol and stirred with charcoal. The filtrate is treated with ether and a sticky precipitate is thus obtained. The 3-[N-(β-diethylaminoethyl) cyclohexanecarboxamido]-2,3-dihydrothionaphthene-1,1-dioxide is obtained in crystalline form by extraction with ether, drying and concentration of the extract. On recrystallization from ethanol it melts at about 137–138° C. It has the structural formula:

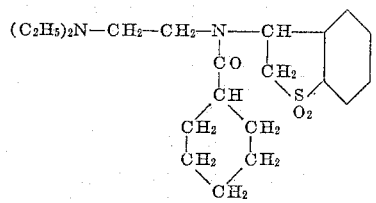

Other crystalline derivatives of the amine are obtained by treatment with other acyl halides, alkyl halides, and aralkyl halides. N-(β-diethylaminoethyl) - N - methylamino - 2,3 - dihydrothionaphthene-1,1-dioxide is obtained by treatment with slightly more than one molecular equivalent of dimethyl sulfate in alkaline solution. A dimethohalide of this compound is obtained by more vigorous methylation, such as treatment with an excess of methyl iodide in a solvent such as butanone. The cation has the structural formula

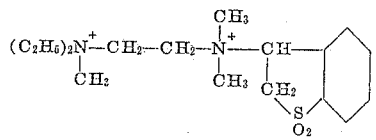

*Example 2*

300 parts of thionaphthene-1,1-dioxide are heated at refluxing temperature with 300 parts of N-(β-aminoethyl)morpholine in 2400 parts of ethanol for thirty minutes. The product is concentrated on the steam bath and then treated with ice and dilute hydrochloric acid. The acid layer is separated and rendered alkaline by addition of dilute potassium hydroxide solution. An oil forms which is extracted with a mixture of benzene and ether. The extract is dried over anhydrous potassium carbonate, filtered and evaporated. Distillation of the 3-(N-morpholinoethyl) amino-2,3-dihydrothionaphthene-1,1-dioxide is inadvisable because of decomposition. It is suitably purified by treatment of a butanone solution with charcoal.

One-half of the butanone solution thus obtained is treated with 200 parts of cyclohexanecarbonyl chloride in 800 parts of butanone by heating at refluxing temperature for 15 hours. The resulting solution is concentrated on the steam bath and on addition of dilute hydrochloric acid the precipitate which forms during the concentration redissolves. The solution is washed with ether and then rendered alkaline by addition of ammonium hydroxide and extracted with ether. The ether extract is dried over anhydrous potassium carbonate, filtered and evaporated. The residual solid is recrystallized from ethanol. The 3-[N-(N-morpholinoethyl)cyclohexanecarboxamido]-2,3-dihydrothionaphthene-1,1-dioxide melts at about 145–146° C. It has the structural formula

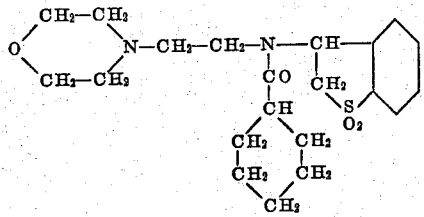

A butanone solution of 3-(N-morpholinoethyl)-amino-2,3-dihydrothionaphthene-1,1-dioxide, obtained from 300 parts of thionaphthene-1,1-dioxide as hereinabove, is benzoylated by heating at refluxing temperature for 15 hours with 400 parts of benzoyl chloride in 2000 parts of butanone. The resulting solution is concentrated on the steam bath and treated with dilute hydrochloric acid. The acid solution is washed with ether, rendered alkaline, and extracted with a mixture of ether and benzene. The extract is dried over anhydrous potassium carbonate, filtered, and evaporated. The residual oil is stirred with charcoal in hot benzene solution and filtered. The filtrate is cooled and treated with a 25% solution of hydrogen chloride in ethanol and with ether whereby a semi-solid yellow precipitate is obtained. The latter is decolorized in an ethyl acetate-isopropanol mixture by means of charcoal. Upon concentration of this solution the 3 - [N - (N - morpholinoethyl)benzamido] - 2,3-dihydrothionaphthene-1,1-dioxide hydrochloride precipitates which melts at about 250–251° C. It has the formula

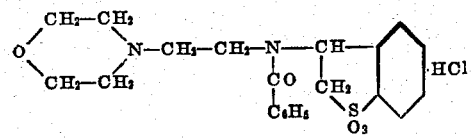

I claim:
1. A member of the class of compounds consisting of 2,3-dihydrothionaphthene-1,1-dioxide derivatives of the following structural formula

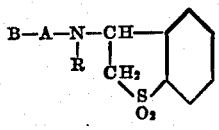

and salts thereof, wherein R is a member of the class consisting of benzoyl and lower cycloalkanoyl radicals containing 4 to 5 nuclear carbon atoms; A is a saturated, bivalent, lower aliphatic hydrocarbon radical containing 2 to 6 carbon atoms; and B is a member of the class consisting of lower dialkylamino and morpholino radicals.

2. The 3-(N-dialkylaminoalkyl-N-acyl)amino-2,3 - dihydrothionaphthene - 1,1 - dioxides of the structural formula

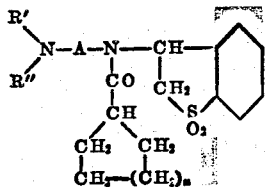

wherein R' and R'' are lower alkyl radicals, A is a saturated, bivalent, lower aliphatic hydrocarbon radical containing 2 to 6 carbon atoms, and $n$ is a positive integer less than 3.

3. The 3-[N-(N-morpholinoalkyl)]isomonocarbocyclylcarboxamido -2,3-dihydrothionaphthene-1,1-dioxides of the structural formula

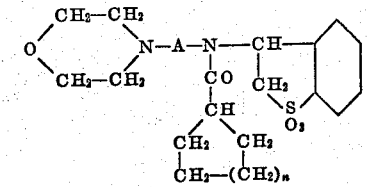

wherein A is a saturated, bivalent, lower aliphatic hydrocarbon radical containing 2 to 6 carbon atoms and $n$ is a positive integer less than 3.

4. The 3-(N-dialkylaminoalkylcyclohexanecarboxamido) - 2,3 -dihydrothionaphthene-1,1-dioxides of the structural formula

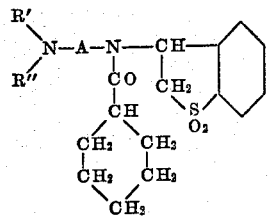

wherein R' and R'' are lower alkyl radicals and A is a saturated, bivalent, lower aliphatic hydrocarbon radical containing 2 to 6 carbon atoms.

5. 3-[N-(β-diethylaminoethyl)cyclohexanecarboxamido] - 2,3 -dihydrothionaphthene-1,1-dioxide.

6.

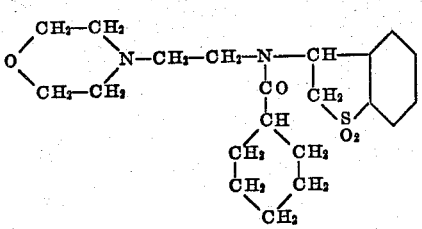

7. The lower 3-[N-(N-morpholinoalkyl)]benzamido - 2,3 - dihydrothionaphthene -1,1-dioxides, wherein the nitrogen atoms are separated by 2 to 6 carbon atoms.

8.

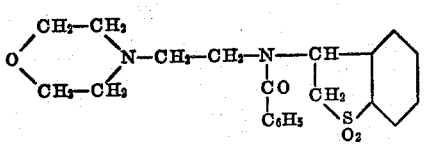

JOHN W. CUSIC.

References Cited in the file of this patent
UNITED STATES PATENTS

| Number | Name | Date |
|---|---|---|
| 2,557,673 | McKellin et al. | June 19, 1951 |

OTHER REFERENCES

Bordwell et al.: J. Am. Chem. Soc., vol. 72, pp. 1985–1988, (May 1950).